Patented Mar. 1, 1938

2,109,552

UNITED STATES PATENT OFFICE 2,109,552

AZO DYESTUFFS AND THEIR METALLIFEROUS DERIVATIVES

Hans Schindhelm, Frankfort-on-the-Main-Fechenheim, Carl Theo Schultis, Bergen, near Hanau-on-the-Main, Gerhard Schrader, Opladen, near Cologne-on-the-Rhine, and Carl Taube, Leverkusen, near Cologne-on-the-Rhine, Germany, assignors to General Aniline Works, Inc., New York, N. Y., a corporation of Delaware No Drawing. Application January 2, 1936, Serial No. 57,252. In Germany January 4, 1935

3 Claims. (Cl. 260—12)

Our present invention relates to azodyestuffs and their metalliferous derivatives, more particularly to those azodyestuffs corresponding to the general formula:

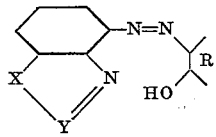

(wherein X means S, NH or N-alkyl, Y means N or C-alkyl, R means the radicle of a combining component and the benzene nucleus may contain as substituents methyl, sulfonic acid, acylamino or an azogroup).

These dyestuffs are obtainable by diazotizing the diazo-compound of a 4-amino-benzothiazole or -benzimidazole or -benzotriazole, which may contain substituents of the aforesaid kind, and by combining the diazo compound with a combining component. The mono- or polyazodyestuffs thus obtained may be further treated with agents yielding metals such as, for instance, copper or chromium.

These dyestuffs and especially their metalliferous derivatives are distinguished by clear shades and good fastness properties.

In order to further illustrate our invention the following examples are given, the parts being by weight and all temperatures in centigrade degrees. We wish it to be understood, however, that our invention is not limited to the particular products or reaction conditions mentioned therein.

Example 1

14,8 parts of 1-methyl-4-amino-azimino-benzene are diazotized at 0° C. with hydrochloric acid and 6.9 parts of sodium nitrite. The diazo compound formed is preferably isolated by filtration and is combined with an ice cooled solution, rendered alkaline with sodium carbonate, of 24 parts of 2-naphthol-7-sulfonic acid. While warm the formed monoazodyestuff of the formula:

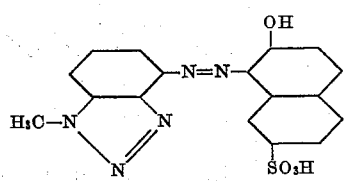

is isolated by the addition of common salt, filtered off and dried. It represents a reddish brown powder, which dissolves in water with an orange and in concentrated sulfuric acid with a bluish red color. It dyes wool clear yellowish red shades which turn to a reddish brown on aftertreating the dyestuff with agents yielding chromium.

If in this example the 1-naphthol-4-sulfonic acid is used instead of the 2-naphthol-7-sulfonic acid, a dyestuff is obtained which dyes wool clear bluish red shades turning to an intense violet when aftertreated with agents yielding chromium.

Example 2

13.4 parts of 4-aminoazimino-benzene are diazotized at 0° C. with hydrochloric acid and 6.9 parts of sodium nitrite and the filtered diazo solution is introduced into a solution, made alkaline with sodium carbonate, of 24 parts of 2-naphthol-5-sulfonic acid. The formed dyestuff of the formula:

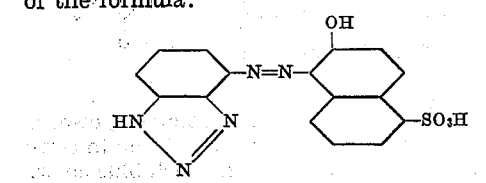

is heated to 60° C., isolated by the addition of common salt filtered off and dried. It represents a dark powder which dissolves in water and in concentrated sulfuric acid with a red color and dyes wool clear orange shades. On aftertreating with agents delivering chromium the shades turn to claret red, the fastness to washing and potting being considerably increased thereby.

*Example 3*

24.5 parts of the sodium salt of 2-naphthylamine-8-sulfonic acid are diazotized at 0° C. with hydrochloric acid and 6.9 parts of sodium nitrite. The diazo solution obtained is allowed to flow into a hydrochloric acid solution of 13.4 parts of 4-amino-azimino-benzene and the whole is stirred until the copulation is finished. Then the formed aminoazodyestuff is isolated by the addition of common salt, filtered off and dissolved in a dilute sodium carbonate solution. When cool, after the addition of 6.9 parts of sodium nitrite, the solution is introduced into hydrochloric acid, mixed with a sufficient quantity of ice. After a short time the further diazotation is finished. Then the diazo compound is allowed to flow into a solution, rendered alkaline with sodium carbonate, of 34 parts of 2-phenylamino-5-naphthol-7-sulfonic acid. The disazo dyestuff is dissolved by heating, precipitated by the addition of common salt, filtered off, purified by washing out and redissolved. Then by treating it in an acetic acid solution with copper sulfate the dyestuff is transformed into its copper complex compound. The dried dark colored dyestuff of the formula:

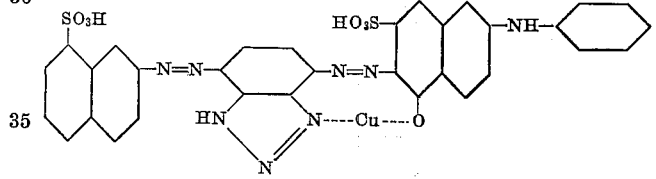

dissolves in water with a violet, in concentrated sulfuric acid with a clear blue color. It dyes cotton strong greyish blue shades, whereas the dyestuff not treated with copper produces violet shades.

*Example 4*

17.3 parts of sulfanilic acid are diazotized in the usual manner and the diazo solution is combined in hydrochloric acid solution with 14.8 parts of 1-methyl-4-amino-aziminobenzene. Then the diazo compound is further diazotized as described in Example 3 and combined with 2-(3'-carboxyphenylamino) - 5 - naphthol - 7 - sulfonic acid; hereafter the dyestuff is transformed into its copper complex compound as described in the Example 3.

The cupriferous dyestuff thus obtained, having the formula:

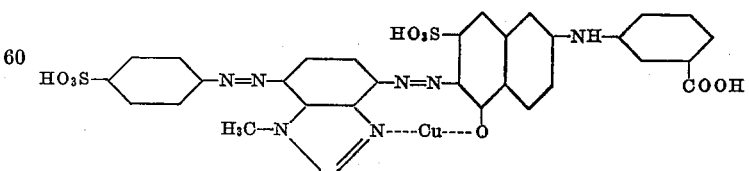

represents when dry a dark colored powder, which dissolves in water with a violet and in concentrated sulfuric acid with a greenish blue color. It dyes cotton reddish blue shades.

*Example 5*

25.8 parts of 2,6-dimethyl-4-amino-benzothiazole-7-sulfonic acid are diazotized at 5° C. with hydrochloric acid and 6.9 parts of sodium nitrite. The diazo compound thus obtained is allowed to run into a soda alkaline solution of an excess of the anilide of 2-naphthol-3-carboxylic acid. The formed dyestuff is isolated by the addition of common salt, filtered off and dried.

The dyestuff of the formula:

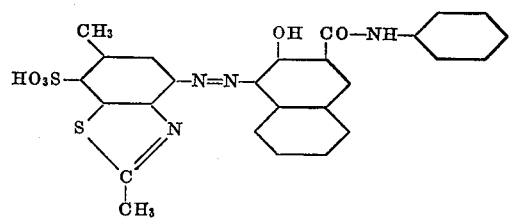

is a brownish red powder. It dissolves in water with a red, in concentrated sulfuric acid with a bluish red color and dyes wool red shades. By treating the dyestuff with agents yielding chromium it becomes more brownish and its fastness to washing is considerably increased.

*Example 6*

25.8 parts of 2,6-dimethyl-4-aminobenzothiazole-7-sulfonic acid are diazotized as decribed in Example 5. Then the diazo compound is allowed to flow into a solution, rendered alkaline with sodium carbonate, of 24 parts of 1-naphthol-4-sulfonic acid. The reaction mass is worked up as described in Example 1.

The dyestuff thus obtained corresponds to the formula:

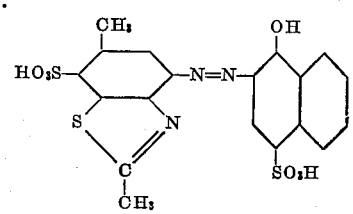

When dry it is a brick red powder which dissolves in water with a red, in concentrated sulfuric acid with a claret red color. It dyes wool clear yellowish red shades, turning to a violet on aftertreating the dyestuff with agents delivering chromium. Its cupriferous derivative is claret red.

*Example 7*

23.5 parts of 2,6-dimethyl-4-amino-7-acetylaminobenzothiazole of the formula:

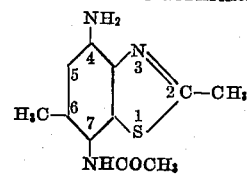

are diazotized in the usual manner in a hydrochloric acid solution with sodium nitrite and the

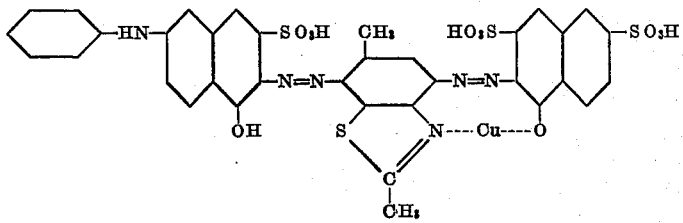

formed diazo compound is coupled in presence of sodium carbonate with 31 parts of 1-naphthol-3,6-disulfonic acid. The monoazodyestuff thus obtained is precipitated by the addition of common salt and stirred for 2 hours at 95° C. in a sulfuric acid of 10% strength in order to saponify the acetylamino group. The precipitated aminoazodyestuff is redissolved with the necessary quantity of a caustic soda lye in the presence of 7 parts of sodium nitrite, and then it is transformed at 0° to +5° C. into its diazocompound by the addition of 36 parts of hydrochloric acid of 19–20° Bé. The diazocompound is combined in a soda alkaline solution with 24 parts of 2-phenylamino-5-naphthol-7-sulfonic acid. The isolated dyestuff represents when dry a greyish black powder which dissolves in concentrated sulfuric acid with a bluish green, in water with a blue, color and dyes cotton bright blue shades of a good affinity.

On treating the dyestuff in an acetic acid medium with copper sulfate neither the coloration of the solution in water nor that in concentrated sulfuric acid is altered. In a like manner also the dyeing on cotton conserves its bright blue shade, whereas their fastness to light is considerably increased. This cupriferous dyestuff corresponds to the formula:

We claim:
1. The cupriferous azodyestuff of the formula:

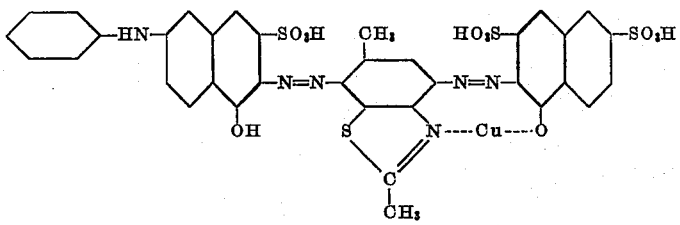

2. Metalliferous azo dyestuffs of the general formula:

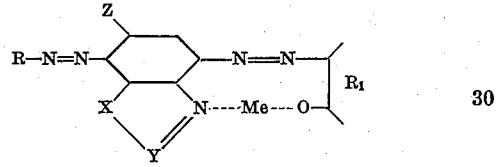

wherein R stands for a member of the group consisting of a radicle of the benzene and naphthalene series containing a sulfonic acid group, Z stands for a member of the group consisting of hydrogen and methyl, X stands for a member of the group consisting of S, NH and N-alkyl, Y stands for a member of the group consisting of N and C-alkyl, $R_1$ stands for the radical of a combining component and Me stands for a metal of the group consisting of copper and chromium.

3. The cupriferous azo dyestuff of the formula:

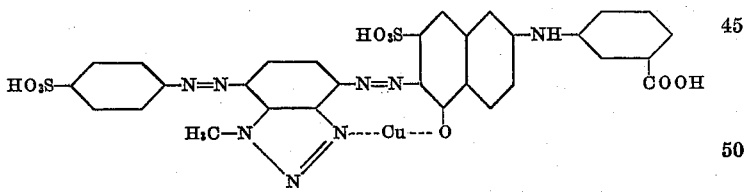

HANS SCHINDHELM.
CARL THEO SCHULTIS.
GERHARD SCHRADER.
CARL TAUBE.